US008225188B2

(12) United States Patent
Basso et al.

(10) Patent No.: US 8,225,188 B2
(45) Date of Patent: Jul. 17, 2012

(54) APPARATUS FOR BLIND CHECKSUM AND CORRECTION FOR NETWORK TRANSMISSIONS

(75) Inventors: Claude Basso, Raleigh, NC (US); Jean Louis Calvignac, Raleigh, NC (US); Chih-Jen Chang, Apex, NC (US); Philippe Damon, Raleigh, NC (US); Ronald Edward Fuhs, Rochester, MN (US); Natarajan Vaidhyanathan, Carrboro, NC (US); Fabrice Jean Verplanken, La Gaude (FR); Colin Beaton Verrilli, Apex, NC (US); Scott Michael Willenborg, Stewartville, MN (US)

(73) Assignee: International Business Machines Corporation, Armonk, NY (US)

(*) Notice: Subject to any disclaimer, the term of this patent is extended or adjusted under 35 U.S.C. 154(b) by 965 days.

(21) Appl. No.: 12/200,985

(22) Filed: Aug. 29, 2008

(65) Prior Publication Data
US 2009/0083611 A1  Mar. 26, 2009

Related U.S. Application Data

(63) Continuation of application No. 11/097,055, filed on Apr. 1, 2005, now abandoned.

(51) Int. Cl.
*H03M 13/00* (2006.01)
(52) U.S. Cl. ...................................... 714/807
(58) Field of Classification Search .......... 714/749–757, 714/786–790, 798–807
See application file for complete search history.

(56) References Cited

U.S. PATENT DOCUMENTS

| 1,724,198 | A | | 8/1929 | Hauser |
| 4,825,406 | A | * | 4/1989 | Bean et al. ............. 710/38 |
| 5,058,110 | A | | 10/1991 | Beach et al. |
| 5,172,371 | A | | 12/1992 | Eng et al. |
| 5,359,659 | A | * | 10/1994 | Rosenthal ............. 726/24 |
| 5,430,842 | A | | 7/1995 | Thompson et al. |
| 5,442,802 | A | | 8/1995 | Brent et al. |
| 5,752,078 | A | | 5/1998 | Delp et al. |
| 5,983,274 | A | | 11/1999 | Hyder et al. |
| 5,991,299 | A | | 11/1999 | Radogna et al. |

(Continued)

FOREIGN PATENT DOCUMENTS
WO  WO 03049488 A1  6/2003

OTHER PUBLICATIONS

Adofl, G., Patent Cooperation Treaty: PCT Notification of Transmittal of the International Preliminary Report on Patentability (PCT Rule 71.1), European Patent Office, Apr. 13, 2007, 7 pages.

(Continued)

*Primary Examiner* — Nadeem Iqbal
(74) *Attorney, Agent, or Firm* — Thomas Tyson; Jeffrey L. Streets

(57) ABSTRACT

Apparatus for providing a checksum in a network transmission. In one aspect of the invention, a checksum for a packet to be transmitted on a network is determined by retrieving packet information from a storage device, the packet information to be included in the packet to be transmitted. A blind checksum value is determined based on the retrieved packet information, and the blind checksum value is adjusted to a protocol checksum based on descriptor information describing the structure of the packet. The protocol checksum is inserted in the packet before the packet is transmitted.

19 Claims, 8 Drawing Sheets

U.S. PATENT DOCUMENTS

| | | | |
|---|---|---|---|
| 6,041,058 A | 3/2000 | Flanders et al. | |
| 6,266,700 B1 | 7/2001 | Baker et al. | |
| 6,400,730 B1 | 6/2002 | Latif et al. | |
| 6,427,169 B1 | 7/2002 | Elzur | |
| 6,650,640 B1 | 11/2003 | Muller et al. | |
| 6,658,002 B1 | 12/2003 | Ross et al. | |
| 6,678,746 B1 | 1/2004 | Russell et al. | |
| 6,724,769 B1 | 4/2004 | Sang | |
| 6,728,929 B1 * | 4/2004 | Luong | 714/807 |
| 6,735,670 B1 | 5/2004 | Bronstein et al. | |
| 6,751,229 B1 | 6/2004 | Waller et al. | |
| 6,754,662 B1 | 6/2004 | Li | |
| 6,788,697 B1 | 9/2004 | Aweya et al. | |
| 6,822,968 B1 | 11/2004 | Lim | |
| 6,937,574 B1 | 8/2005 | Delaney et al. | |
| 6,954,463 B1 | 10/2005 | Ma et al. | |
| 6,970,419 B1 | 11/2005 | Kalkunte et al. | |
| 6,976,205 B1 | 12/2005 | Ziai et al. | |
| 6,988,235 B2 | 1/2006 | Brown | |
| 7,023,811 B2 | 4/2006 | Pinto | |
| 7,031,304 B1 | 4/2006 | Arberg et al. | |
| 7,062,570 B2 | 6/2006 | Hong et al. | |
| 7,098,685 B1 | 8/2006 | Agrawal et al. | |
| 7,124,198 B2 | 10/2006 | Pinkerton | |
| 7,131,140 B1 | 10/2006 | O'Rourke et al. | |
| 7,134,796 B2 | 11/2006 | Anderson | |
| 7,164,678 B2 | 1/2007 | Connor | |
| 7,218,632 B1 | 5/2007 | Bechtolsheim et al. | |
| 7,251,704 B2 | 7/2007 | Solomon | |
| 7,260,120 B2 | 8/2007 | Kang et al. | |
| 7,269,661 B2 | 9/2007 | Ree et al. | |
| 7,271,706 B2 | 9/2007 | Lee et al. | |
| 7,274,706 B1 | 9/2007 | Nguyen et al. | |
| 7,283,528 B1 * | 10/2007 | Lim et al. | 370/392 |
| 7,286,557 B2 | 10/2007 | Feuerstraeter et al. | |
| 7,292,586 B2 | 11/2007 | Dewan et al. | |
| 7,292,591 B2 | 11/2007 | Parker et al. | |
| 7,295,553 B2 | 11/2007 | Saitoh | |
| 7,298,761 B2 | 11/2007 | Hong | |
| 7,308,006 B1 | 12/2007 | Banerjee et al. | |
| 7,349,399 B1 | 3/2008 | Chen et al. | |
| 7,360,217 B2 | 4/2008 | Melvin et al. | |
| 7,366,194 B2 | 4/2008 | Yu et al. | |
| 2001/0027496 A1 | 10/2001 | Boucher et al. | |
| 2002/0048270 A1 | 4/2002 | Allen et al. | |
| 2003/0026252 A1 | 2/2003 | Thunquest et al. | |
| 2003/0088689 A1 | 5/2003 | Alexander | |
| 2003/0103499 A1 | 6/2003 | Davis et al. | |
| 2003/0154399 A1 | 8/2003 | Zuk et al. | |
| 2003/0227920 A1 | 12/2003 | Benayoun et al. | |
| 2004/0022094 A1 | 2/2004 | Radhakrishnan et al. | |
| 2004/0030766 A1 | 2/2004 | Witkowski | |
| 2004/0064590 A1 | 4/2004 | Starr et al. | |
| 2004/0081145 A1 | 4/2004 | Harrekilde-Peterson et al. | |
| 2004/0100952 A1 * | 5/2004 | Boucher et al. | 370/389 |
| 2004/0109465 A1 | 6/2004 | Kim et al. | |
| 2004/0128398 A1 | 7/2004 | Pettey | |
| 2004/0177275 A1 | 9/2004 | Rose et al. | |
| 2004/0202189 A1 | 10/2004 | Arndt et al. | |
| 2004/0218623 A1 | 11/2004 | Goldenberg et al. | |
| 2005/0022017 A1 | 1/2005 | Maufer et al. | |
| 2005/0076136 A1 * | 4/2005 | Cho et al. | 709/231 |
| 2005/0089031 A1 * | 4/2005 | Krueger | 370/389 |
| 2005/0108611 A1 | 5/2005 | Vogt | |
| 2005/0114663 A1 | 5/2005 | Cornell et al. | |
| 2005/0120160 A1 | 6/2005 | Plouffe et al. | |
| 2005/0149677 A1 | 7/2005 | Shimada et al. | |
| 2005/0174153 A1 | 8/2005 | Saeki | |
| 2005/0256975 A1 | 11/2005 | Kaniz et al. | |
| 2006/0031600 A1 | 2/2006 | Ellis et al. | |
| 2006/0120289 A1 | 6/2006 | Cunningham | |
| 2006/0187928 A1 | 8/2006 | McGee et al. | |
| 2006/0216958 A1 | 9/2006 | Yee et al. | |

OTHER PUBLICATIONS

Balena, F., "Speed up searched with hash tables," Nov. 13, 2001, DevX.com all pages.

Braden, "Computing the Internet Checksum," RFC 1071, Sep. 1988.

Cunningham, D.G., The Status of the 10-Gigabit Ethernet Standard, 2001, 27th European Conference on Optical Communication, 2001, ECOC, 2001, vol. 3, pp. 364-367.

IP COM, "Reusing a 10Gbps Ethernet Media Access Controller for a 1Gbps/100Mbps Ethernet," located at www.ip.com, IP.com No. IPCOM000133402D, Jan. 25, 2006, 6 pages.

Kung, H.T., "Gigabit Local Area Networks: A System Perspective," Apr. 1992, IEE Communications Magazine vol. 30, Issue 4, pp. 79-89.

Mazzucco, "The Fundamentals of Cache," SystemLogic.Net, Oct. 17, 2000.

Rijshinghani, "Computing the Internet Checksum Via Incremental Update," RFC 1624, May 1994.

Rummery, A., Patent Cooperation Treaty: PCT Notification of Transmittal of the International Search Report and the Written Opinion of the International Search Report and the Written Opinion of the International Searching Authority, or the Declaration (PCT Rule 44.1), European Patent Office, Jul. 5, 2006, 11 pages.

Touch, "Implementing the Internet Checksum in Hardware," RFC 1936, Apr. 1996.

Acayan, Joseph, "Facsimile Transmital", Apr. 22, 2008, Sayer Law Group, LLP, 1 page.

EPO "Communication—European Search Report", EP Application No. EP11168414.8, Reference: RPS920050062EP2, Oct. 7, 2011, 5 pages.

* cited by examiner

APPARATUS FOR BLIND CHECKSUM AND CORRECTION FOR NETWORK TRANSMISSIONS

CROSS-REFERENCE TO RELATED APPLICATIONS

This application is a continuation application under 35 USC §120, and claims the benefit of priority to U.S. patent application Ser. No. 11/097,055 filed Apr. 1, 2005, entitled "Method for Blind Checksum and Correction for Network Transmissions", all of which is incorporated herein by reference.

The present application is related to the following copending U.S. patent applications:

U.S. patent application Ser. No. 11/097,608, entitled "Host Ethernet Adapter for Networking Offload in Server Environment", filed on even date herewith and assigned to the assignee of the present invention.

U.S. patent application Ser. No. 11/096,363, entitled "Method and System for Accommodating Several Ethernet Ports and a Wrap Transmitted Flow Handled by a Simplified Frame-By-Frame Upper Structure", filed on even date herewith and assigned to the assignee of the present invention.

U.S. patent application Ser. No. 11/096,571, entitled "Method and Apparatus for Providing a Network Connection Table", filed on even date herewith and assigned to the assignee of the present invention.

U.S. patent application Ser. No. 11/097,051, entitled "Network Communications for Operating System Partitions", filed on even date herewith and assigned to the assignee of the present invention.

U.S. patent application Ser. No. 11/097,652, entitled "Configurable Ports for a Host Ethernet Adapter", filed on even date herewith and assigned to the assignee of the present invention.

U.S. patent application Ser. No. 11/096,365, entitled "System and Method for Parsing, Filtering, and Computing the Checksum in a Host Ethernet Adapter (HEA)", filed on even date herewith and assigned to the assignee of the present invention.

U.S. patent application Ser. No. 11/096,353, entitled "System and Method for a Method for Reducing Latency in a Host Ethernet Adapter (HEA)", filed on even date herewith and assigned to the assignee of the present invention.

U.S. patent application Ser. No. 11/267,473, entitled "Method and System for Performing a Packet Header Lookup", filed on even date herewith and assigned to the assignee of the present invention.

U.S. patent application Ser. No. 11/097,430, entitled "System and Method for Computing a Blind Checksum in a Host Ethernet Adapter (HEA)", filed on even date herewith and assigned to the assignee of the present invention.

FIELD OF THE INVENTION

The present invention relates to network transmissions for computer devices, and more particularly to error detection using checksums in network transmissions.

BACKGROUND OF THE INVENTION

Computer systems communicate over networks by establishing and using network connections. When providing secure network connections, one concern is that data may be lost during network transmission, and various techniques are used to ensure that data is not lost in transit. An additional concern is the risk that errors will be introduced in data from transmission over the network. One technique for detecting network transmission errors in data uses what is known as a checksum. The basic technique of a checksum is to take a string of data bytes (or other unit of storage) and add them together, then send this sum with the data stream and have the receiver check the sum using the same method used to create the sum. If the receiver's calculated sum matches the sum in the data stream, then no errors have been introduced during transmission.

For example, the Transmission Control Protocol (TCP) provides basic protection against errors in transmission by including a 16-bit Checksum field in the header of each data packet. In TCP, a standard algorithm is used to calculate the checksum which is slightly different than a conventional checksum algorithm. Instead of computing the checksum over only the actual data fields of the TCP segment, a 12-byte TCP pseudo header is created prior to checksum calculation. This header includes information taken from fields in both the TCP header and the IP datagram into which the TCP segment will be encapsulated. The TCP pseudo header includes a source Internet Protocol (IP) address of the originator (taken from the IP header), destination IP address of the intended recipient (taken from the IP header), a reserved field, a protocol field for specifying the protocol used, and a TCP length field specifying the length of the TCP segment including header and data (body) (which is calculated by the originator). The formed pseudo header is placed in a buffer, followed by the TCP segment, and the checksum is computed over this set of data (pseudo header plus TCP segment). The value of the checksum is placed into the Checksum field of the TCP header, and the pseudo header is discarded, since it is not an actual part of the packet and is not transmitted.

The packet is transmitted over the network, and the receiver performs the same calculation by forming the pseudo header performing the checksum (ignoring the Checksum value in the header field to replicate the original condition). If there is a mismatch between its calculation and the value in the Checksum field, this indicates that an error of some sort occurred, and the packet can then be discarded or the error noted. The checksum thus protects against errors in the TCP segment fields and against incorrect segment delivery (if there is a mismatch in the Source or Destination Address), incorrect protocol, and incorrect segment length.

TCP checksum generation is often performed in hardware to achieve faster performance. Since the TCP checksum field is in the packet header, which is transmitted before the packet data, true "on-the-fly" checksum generation is not provided. The packet data must be stored in transmission data buffers, and once the entire packet is received, the checksum can be generated and placed in the header, and then the packet can then start to be transmitted.

One problem with this packet transmission method is that it requires random access to the data buffers storing the packet, so that the checksum field can be accessed and written to with the determined checksum value. This random access capability to a large output buffer adds expense to the system and is slow and sequential, adding latency to the system. Furthermore, the determination of the checksum value can add processing time to the transmission process, since the checksum value is determined only after the packet is fully stored in the data buffer.

In addition, portions of the packets to be transmitted are often stored in different configurations. For example, the header of a packet might be stored in an area of memory easily retrieved with a descriptor, but the body of the packet may be stored elsewhere in memory. Or the header may be stored with the body. However, there are no existing methods to efficiently combine parts of a packet and handle the different packet storage configurations for checksum determination when transmitting.

Accordingly, what is needed is an apparatus and method for providing a network transmission mechanism that can efficiently process checksums for outgoing packets with minimal access to storage buffers, much-reduced latency, and efficient handling of packet storage configurations. The present invention addresses such a need.

SUMMARY OF THE INVENTION

The invention of the present application relates to providing a checksum in a network transmission. In one aspect of the invention, a method for determining a checksum for a packet to be transmitted on a network includes retrieving packet information from a storage device, the packet information to be included in the packet to be transmitted. A blind checksum value is determined based on the retrieved packet information, the blind checksum value is adjusted to a protocol checksum based on descriptor information describing the structure of the packet. The protocol checksum is inserted in the packet before the packet is transmitted.

In another aspect of the invention, an apparatus for determining a checksum for a packet to be transmitted on a network includes a memory access unit that retrieves packet information from a storage device, the packet information to be included in the packet to be transmitted. An accumulator determines a blind checksum value based on the retrieved packet information, and a transmission unit adjusts the blind checksum value to a protocol checksum based on descriptor information describing the structure of the packet. The transmission unit inserts the protocol checksum in the packet and outputs the packet for transmission on the network.

The present invention provides a method and apparatus that allows efficient checksum determination and transmission of packets having a checksum by determining a blind checksum, if necessary, and adjusting that blind checksum on-the-fly and without random accesses to data buffers. The invention allows low-latency checksum determination and packet transmission and flexibility in handling multiple packet information storage configurations.

DETAILED DESCRIPTION

The present invention relates to network transmissions for computer devices, and more particularly to error detection using checksums in network transmissions. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of systems provided in particular implementations. However, one of ordinary skill in the art will readily recognize that this method and system will operate effectively in other implementations. For example, the system architectures and network configurations usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1 through 5b in conjunction with the discussion below. The present invention is described in the context of a TCP/IP protocol network system; however, other protocols (such as User Datagram Protocol (UDP), etc.) and configurations can be used in other embodiments.

Figure 1:
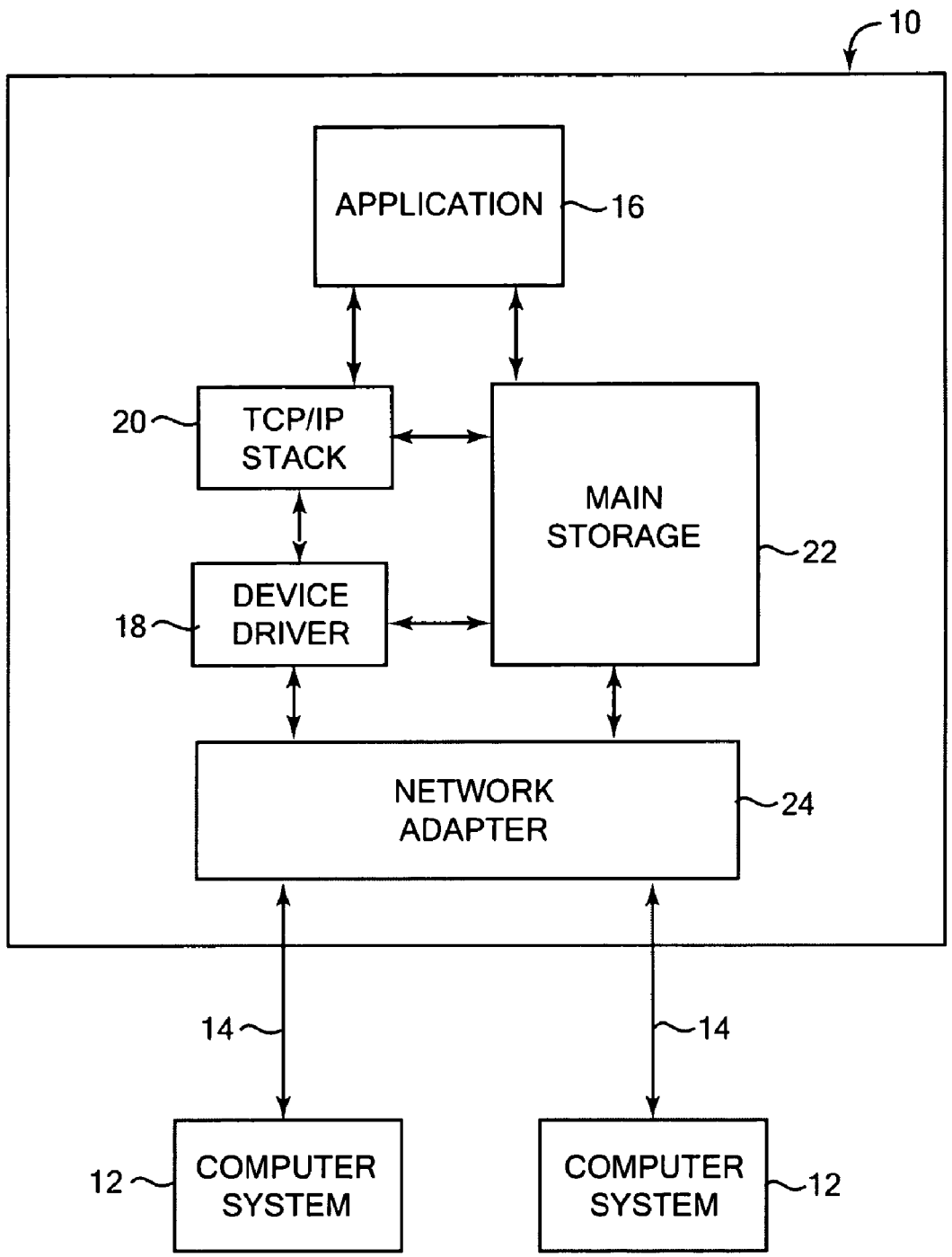
FIG. 1 is a block diagram of an example of a system suitable for use with the present invention.

FIG. 1 is a block diagram of a system 10 suitable for use with the present invention. System 10 is a computer system such as a server, mainframe, desktop client computer, workstation, or other computer or electronic device. System 10 can communicate with various other computer systems 12 over a network 14. System 10 can run one or more applications 16, which are processes running on the system. For example, an application 16 can provide data that is to be sent out over the network to one or more computer systems 12.

System 10 includes one or more TCP/IP stacks 20 to manage network communications to and from the system 10. The stack 20 is process code in an operating system or user software space running on the server which handles the incoming and outgoing data to and from the network connections 14. The TCP/IP stack can establish a new network connection to a server application 16, provide packets to an existing connection, etc. Each application 16 may have one or more connections. For example, the stack 20 (and/or other components) can provide data from application 16 as TCP/IP network packets to destination ports and addresses over the network 14. The stack 20 also receives network packets provided by other computer devices 12 on the network and provides the packets to the application 16 via network connections. The TCP/IP stack 20 can access main storage 22 of the system 10 to store packets intended to be sent out on the network 14. Storage 22 can be any suitable type of memory provided on a computer system, as is well known.

One or more device drivers 18 is running on the system 10 and can interface with the main memory 22 as well as the network adapter 24. The device driver 18 can, for example, write a packet descriptor into the main storage 22 with some parameters given by the TCP/IP stack 20 or even by an application 16. The packet descriptor ("descriptor") includes characteristics for a packet to be transmitted and instructions as to what actions to take for the packet, which may be stored elsewhere in main storage 22, such as in buffers, and a pointer or address of where portions of the packet is stored in main storage 22, if applicable.

A network adapter 24 is used to provide the physical connection point between the system 10 and other computer systems 12 connected to the network 14. Adapter 24 can be, for example, a hardware network interface adapter. The adapter can take packets provided in main storage 22 and process them for transmission on the network, and send out the packets, as well as receive packets from the network 14. For example, in the present invention, the adapter 14 includes processing components so that the adapter can determine a TCP checksum that is added to each TCP/IP data packet before it is output on the network 14. This is detailed below with respect to FIGS. 2*a-c* and FIG. 3.

A checksum value is added to the header of each TCP packet using a particular method so that a receiver of the packet can use the same checksum method to generate its own checksum value and compare with the checksum value in the packet to determine if the packet has any transmission errors. A "packet", as referenced herein, is an entire TCP/IP packet, including an Ethernet header (including a Media Access Control (MAC) address), followed by an Internet Protocol (IP) header, followed by a TCP header, and followed by a body (data). The TCP segment is the TCP header and the body. The terms apply analogously to other protocols used in other embodiments, such as UDP.

A packet for transmission may be split such that different parts of the packet are stored in different areas of main memory 22 by the stack 20. Three examples that show how a packet intended for transmission may be distributed in main storage 22, and that show different systems for an adapter 20 for processing those packet distributions, are described below with reference to FIGS. 2*a*, 2*b*, and 2*c*.

Figure 2A:
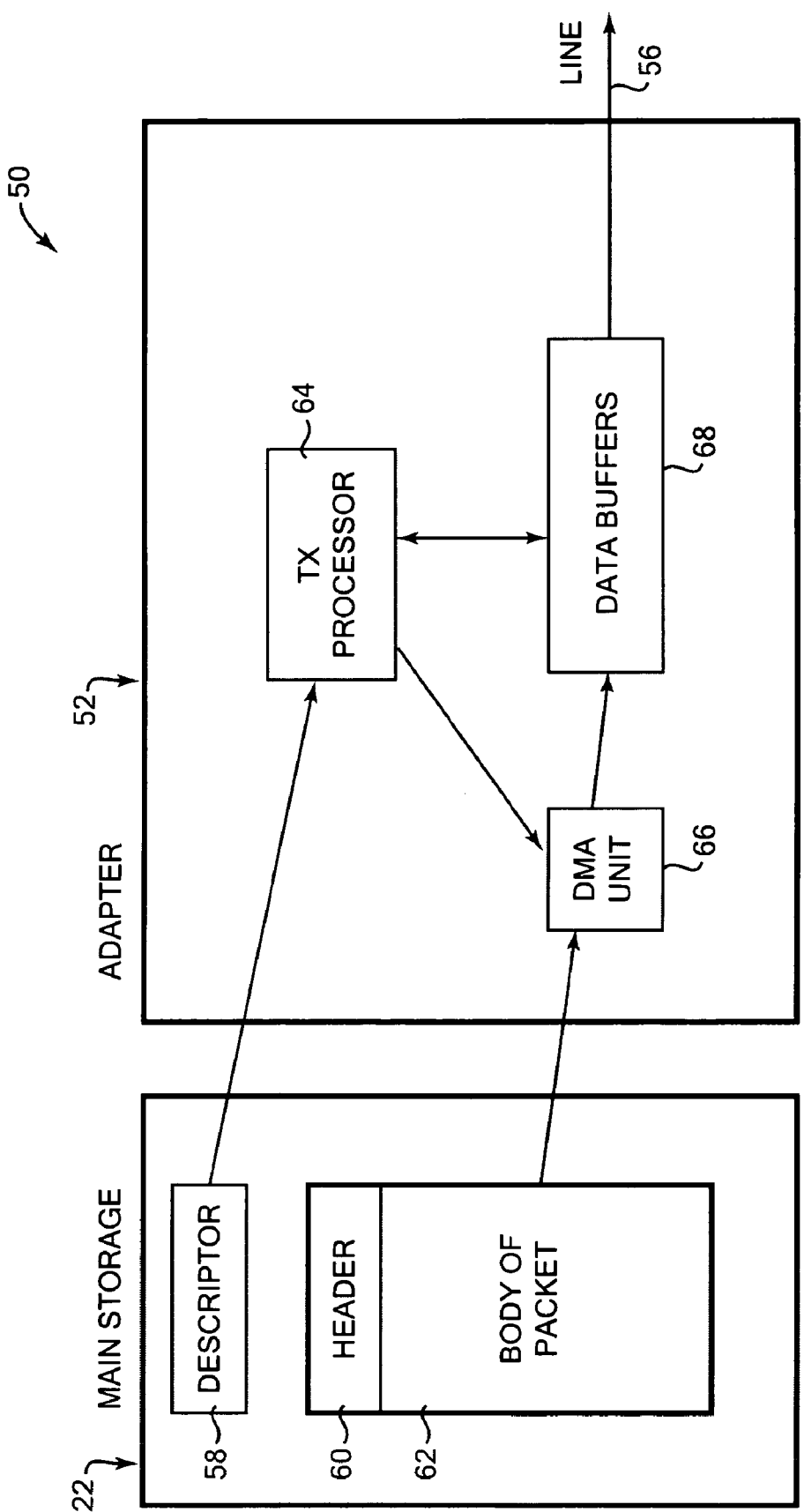
FIGS. 2a, 2b, and 2c are block diagrams illustrating different packet transmission systems that process packets and outputs them on a connection line to a network.

FIG. 2*a* is a block diagram illustrating a packet transmission system 50 including main storage 22 and a hardware adapter 52 that processes packets and outputs them on a connection line 56. In the example of FIG. 2*a*, a descriptor 58 has been written into the main storage 22 by a device driver or other program running on the system 10 which governs the sending out of a packet (e.g., with some parameters given by the TCP/IP stack 20 or even by an application 16). The descriptor 58 includes instructions as to what actions to take for an associated packet stored elsewhere in main storage 22, and a pointer or address of where the body of the packet is stored in main storage 22.

Header 60 is the header for the packet associated with the descriptor 58. The header includes the standard TCP and IP header information, as well as other header information such as Ethernet MAC address, if applicable. The header was placed in the main buffer main storage by the TCP/IP stack 20, while the Ethernet header, if present, was placed by an Ethernet device driver. Body 62 is stored in the buffer in the same partition of main storage 22 as the header 60 and is the data for the packet associated with the descriptor 58. Body 62 was placed in main storage by an application 16 running on the system or was copied there by the TCP/IP stack 20.

When transmitting the packet, a Tx processor 64 on the adapter 52 retrieves the descriptor 58 from an area of main storage 22 (a "descriptor area" which is the area where the descriptor is stored). The Tx processor 64 then instructs a Direct Memory Access (DMA) unit 66 to retrieve the packet header 60 and body 62 from the buffer of main storage 22 at an address indicated by the retrieved descriptor 58. The DMA unit 66 provides the retrieved packet header and body to the data buffers 68 of the adapter 52. Tx processor 64 retrieves the header and body from data buffers 68 using random access, e.g., one byte at a time, and determines a checksum. The checksum is calculated by creating a TCP pseudo header that includes parts of the IP header within the header 60 (a source IP address, destination IP address, and protocol), and a TCP segment length (calculated by processor 64 or received as information in the descriptor 58). The checksum is calculated based on the TCP segment and pseudo header. The Tx processor then writes the checksum value back to the data buffers 70 in the TCP checksum field of the header 60. The header and body are then output from the data buffers 70 on the network connection line 56 to a destination on the network.

Figure 2B:
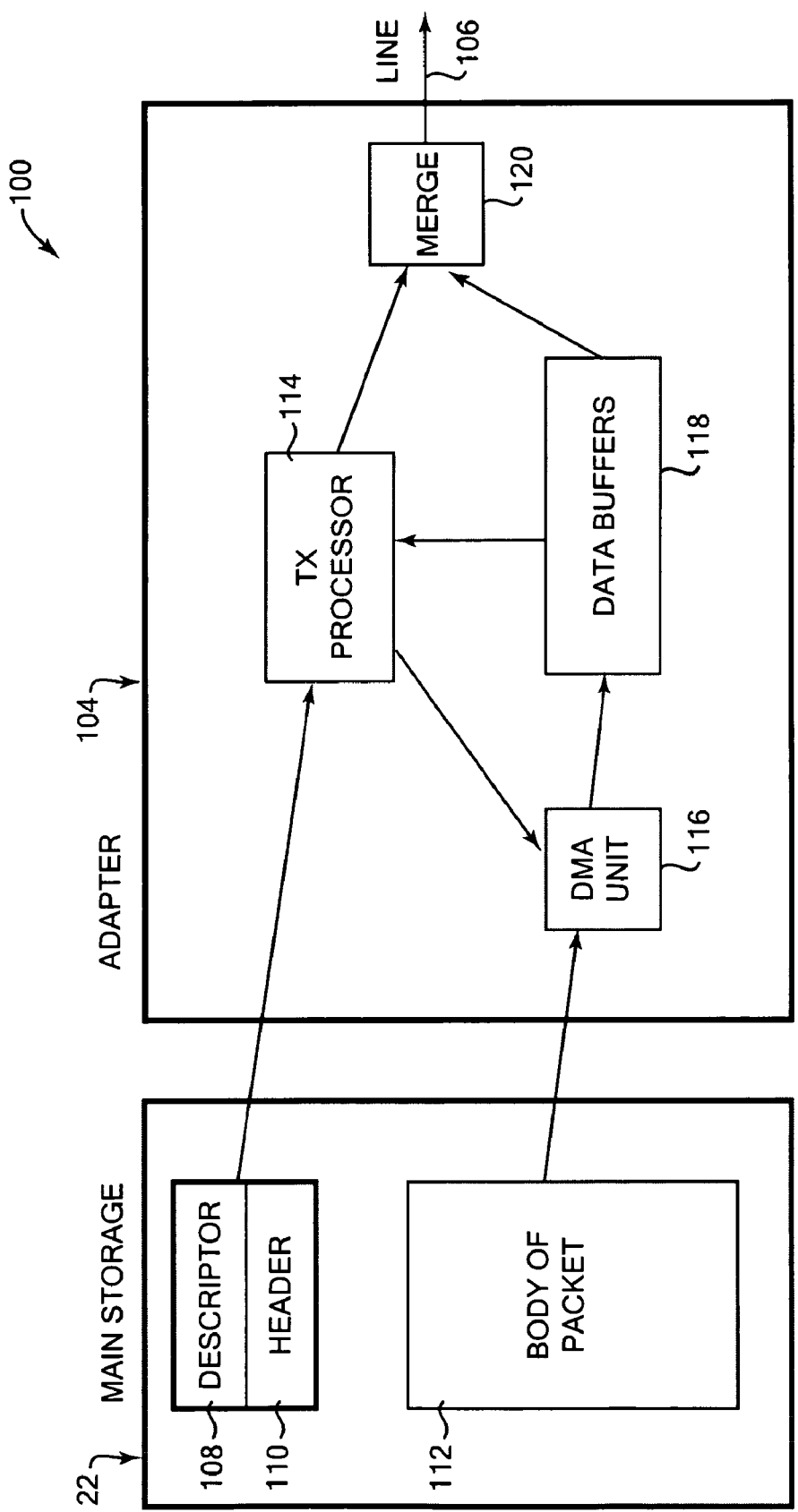

FIG. 2*b* is a block diagram illustrating a packet transmission system 100 including main storage 22 and a hardware adapter 104 that processes packets and outputs them on a connection line 106. In the example of FIG. 2*b*, a descriptor 108 has been written into a descriptor area of main storage 22 by a device driver or other program running on the system 10. Similar to the example of FIG. 2*a*, the descriptor 108 includes instructions as to what actions to take for an associated packet stored elsewhere in main storage 22, and a pointer or address of where the body of the packet is stored in main storage 22.

In this example, the header 110 of the packet associated with the descriptor 108 is stored in same descriptor area and block of main storage 22 as the descriptor 108. For example, the header 110 can directly follow the descriptor 108 in memory. This storage scheme may have occurred to due particular circumstances and efficiencies in the system 10. For example, the protocol stack 20 and device driver may coordinate to store the descriptor and header in the same block of main storage, for efficiency. Or, there may be advantages for keeping application data (the body) separate from the header, e.g., in the case that the application wishes to eliminate the copy of data by the TCP/IP stack between application buffers and operating system kernel buffers (a.k.a. a "zero-copy"). The body 112 of the packet is stored in the buffer of main storage 22 at some location and memory block different than descriptor 108 and header 110.

When transmitting the packet, a Tx processor 114 on the adapter 104 retrieves the descriptor 108 and header 110 from main storage 22. The Tx processor 114 then instructs a DMA unit 116 to retrieve the packet body 112 from main storage 22 at an address indicated by the descriptor 108. The DMA unit 116 provides the body 112 to the data buffers 118 of the adapter 104. The Tx processor 114 retrieves the body 112 from the data buffers 118 using random access, e.g., one byte at a time, and determines a checksum. As in the example of FIG. 2*a*, the checksum is calculated over the TCP segment of the packet and a created pseudo header. The Tx processor stores the checksum value in the header 110 and the header 110 is sent to a merge block 120 from Tx processor 114. The data buffers 118 are instructed to send the body 112 to merge block 120 after the header 110, so that the body is merged with the header and the full packet is output on connection line 106. This system 100 requires less access and writing to the data buffers 118 than the system 50 of FIG. 2*a* and thus can be more efficient (and merge unit is typically more efficient than writing to data buffers 118).

Figure 2C:
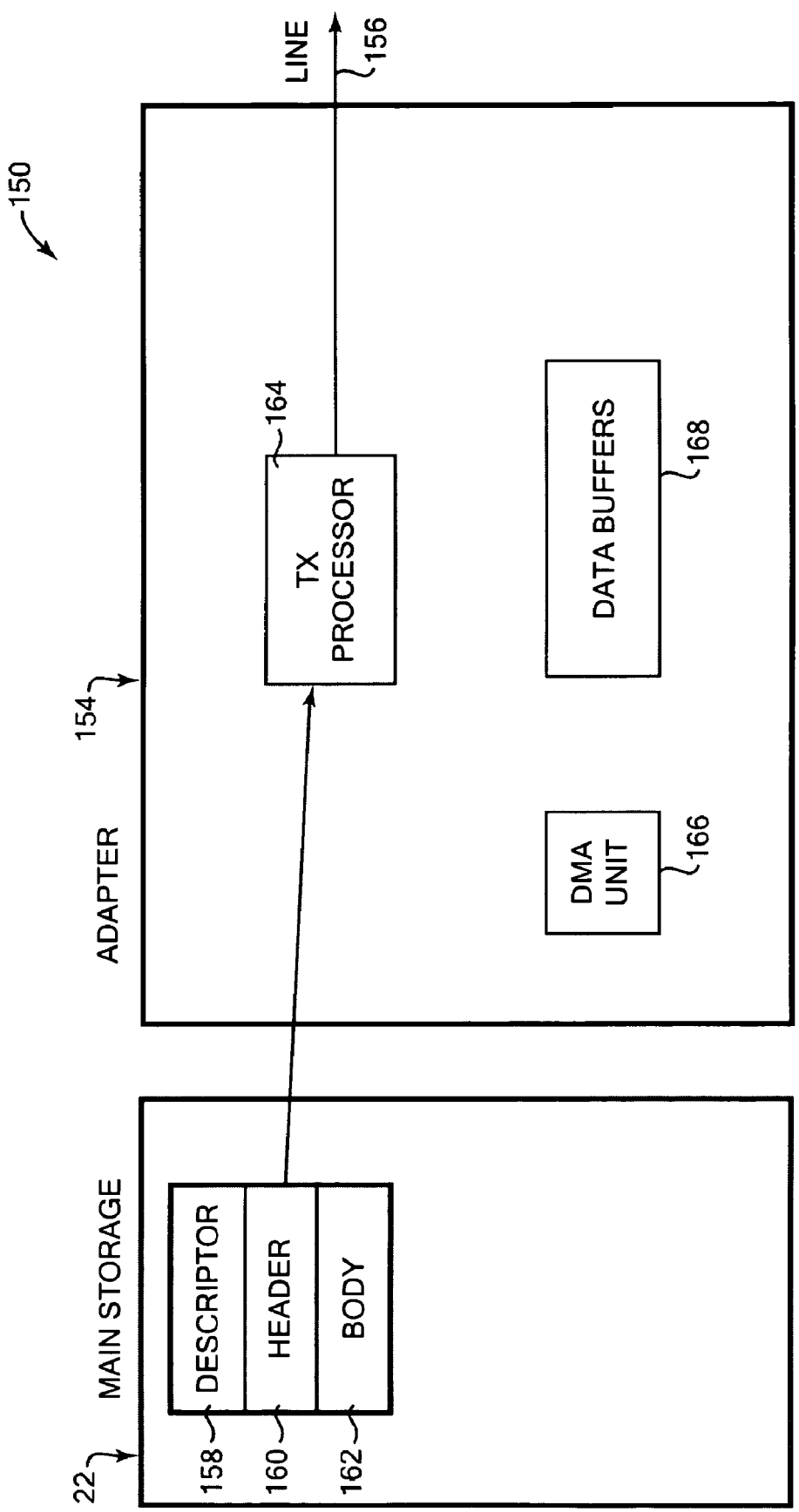

FIG. 2*c* is a block diagram illustrating a packet transmission system 150 including main storage 22 and a hardware adapter 154 that processes data packets and outputs them on a connection line 156. In this system, the descriptor 158, the associated packet header 160, and the associated packet body 162 are stored in the descriptor area of main storage 102, e.g., contiguously. This storage configuration is made possible if the body 162 is small enough in size so that it does not need to be stored and processed using larger data buffers 168. When transmitted the packet, the descriptor 158, header 160, and body 162 are retrieved by the Tx processor 164 of the adapter 154, which has all the information it needs to calculate a checksum as explained above, add the checksum to the appropriate field of the header 160, and output the header 160 and body 162 as a packet on connection line 156. This example and system do not require use of a DMA unit 166 or data buffers 168 on the adapter 154, and do not require address translation to read the packet information from the buffer of main storage 22, and thus is the most efficient of the examples of FIGS. 2a-2c.

Figure 3:
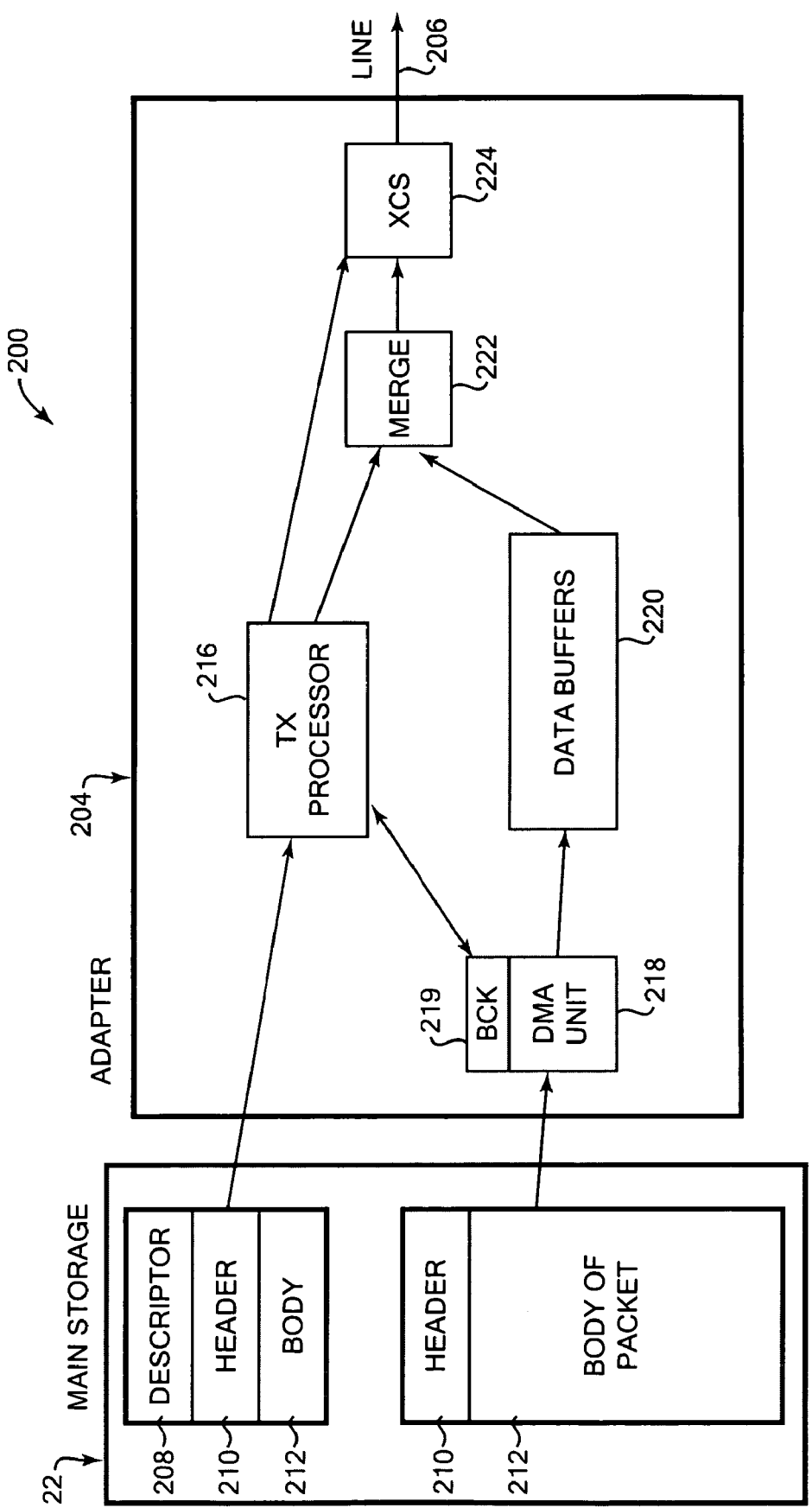
FIG. 3 is a block diagram illustrating a packet transmission system of the present invention which can handle the different situations illustrated in FIGS. 2a-2c.

FIG. 3 is a block diagram illustrating a packet transmission system 200 of the present invention. Advantages of system 200 include its ability to handle any of the three cases illustrated in FIGS. 2a-c, and it performs on-the-fly checksum accumulation and checksum adjustment, and thus faster, more efficient packet transmission. Furthermore, it requires no random access to the data buffers and thus no additional logic and latency for that function.

System 200 includes main storage 22 and a network hardware adapter 204, which includes components that process packets to be sent out and output the packets on a connection line 206 of the network.

Main storage 22 stores the parts of the packet that is to be transmitted. The possible storage locations for parts of the packet are all illustrated in FIG. 3, to indicate that all of these cases can be handled by system 200. Thus, a descriptor 208 is stored in main storage 22, by a device driver or other program running on the system 10 which is sending out a packet, in a descriptor area. In some cases, the header 210 of the packet is stored in the same descriptor area and block of memory as the descriptor 208, as described above with reference to FIG. 2b. And in some cases, the body 212 (if it is small enough) is stored in the same descriptor area and block of memory with the descriptor 208 and header 210, as described above with reference to FIG. 2c (also, the IP header portion of the header 210 could be stored with the descriptor 208 and the TCP header portion of header 210 stored with the body 212). In other cases, the header 210 and the body 212, or just the body 212, are stored in a buffer area of main storage 22 different than the area storing descriptor 208, as described above with reference to FIGS. 2a and 2b.

The processing system 200 on adapter 204 includes a Tx processor 216 that controls the packet transmission functions of the system 200. Tx processor 216 retrieves descriptor 208 and other packet information (if present) from main storage 22, and sends appropriate instructions and data to the components of the system 200 to control their operation, including a DMA unit 218, data buffers 220, a merge unit 222, and an XCS unit 224. The term "packet information," as used herein, refers to a packet header 210 and/or body 212.

DMA unit 218 retrieves the header 210 and body 212 of the packet, if stored in a different area of main storage than the descriptor 208. In the present invention, an accumulator 219 has been added to the DMA unit 218 to perform a blind checksum for received data on-the-fly (as it is being retrieved), and provides the blind checksum value to Tx processor 216, which sends the blind checksum value to the XCS unit 224. The merge unit 222 merges any packet information provided by the Tx processor (such as header 210 in some cases) with any packet information received from the data buffers 220. The data buffers 220 are large enough to hold the maximum size of packet usable with the system 200 and computer system 10.

Transmit Checksum (XCS) unit 224 of the present invention is provided after merge unit 222 and receives the packet information merged by that unit. The XCS unit performs an adjustment and correction of the blind checksum value provided by the Tx processor 216 to create a standard TCP checksum value. The XCS unit is given other information from the Tx processor 216 to facilitate the adjustment process. The XCS unit can adjust the blind checksum as the packet header is received, and outputs the packet on line 206 and out to the network 14 on-the-fly after the adjustment of the blind checksum is performed based on the header of the packet.

It should be noted that embodiments of the system 200 of the present invention can perform multiple DMA actions by DMA unit 218. For example, there can be "gather" descriptors in descriptor 208, which are different DMA instructions, each pointing to different areas of memory. This can cause several DMA operations to happen sequentially by the DMA unit 218. This can be appropriate, for example, in a case in which packet information for a packet, such as the body, is split across many different non-contiguous areas of main storage 22; each DMA action can retrieve packet information from a different area of main storage.

In some embodiments, there can be multiple Tx processors 216 and DMA units 218 working in parallel to speed the processing of packets.

Figure 4:
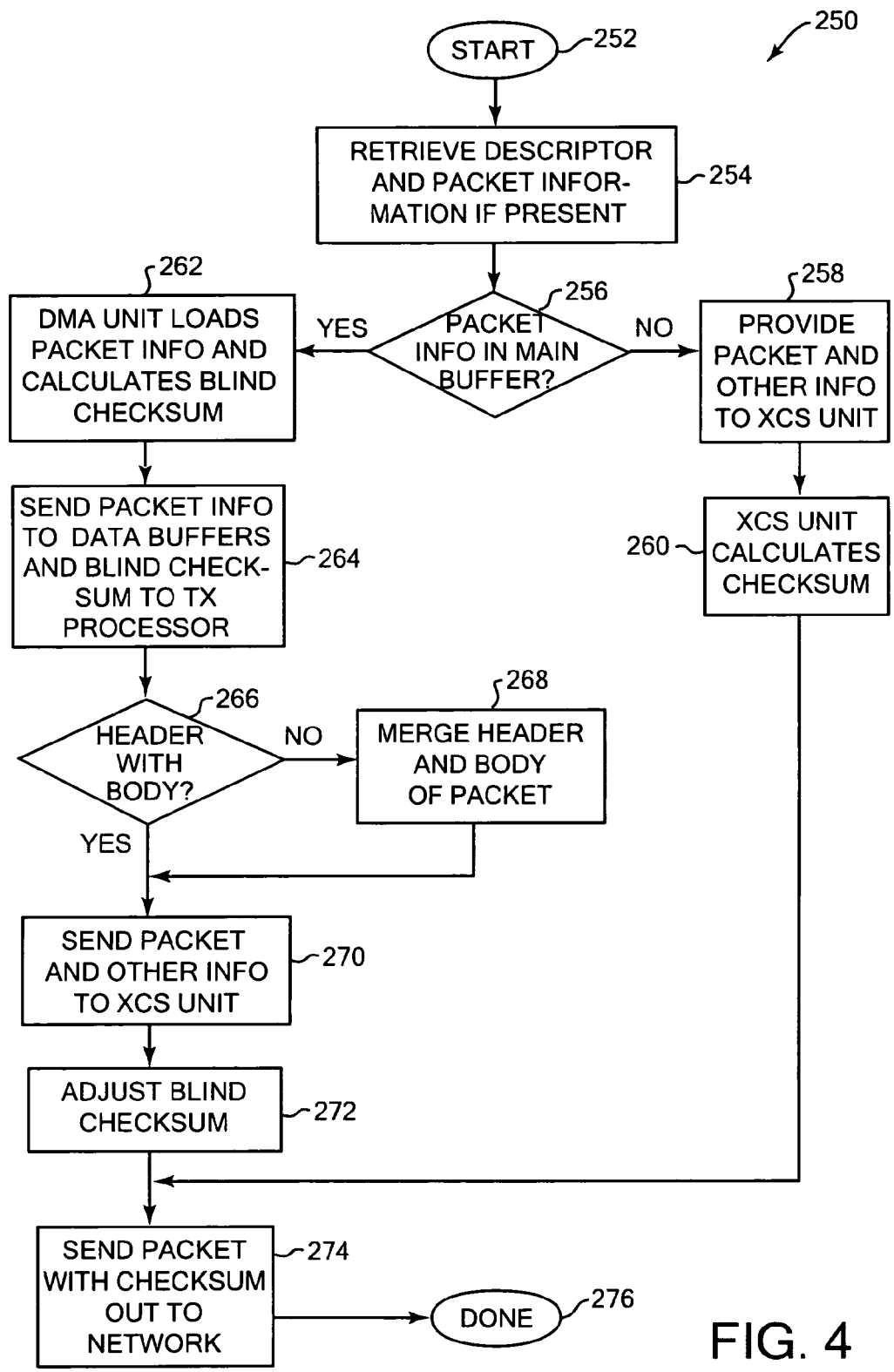
FIG. 4 is a flow diagram illustrating a method of the present invention for providing a checksum for a packet to be transmitted over a network.

FIG. 4 is a flow diagram illustrating a method 250 of the present invention for providing a checksum for a packet to be transmitted over a network. This process is implemented preferably by the network adapter 24 in hardware.

The process begins at 252, and in step 254, a descriptor 208 is retrieved from the descriptor area of main storage 22 by the Tx processor 216. Any packet information stored in the descriptor area which may be stored with the descriptor (in appropriate cases) is also retrieved, such as header 210, or header 210 and body 212, of the packet. In step 256, the process checks whether there is packet information in the main buffer of main storage 22 to be loaded. In some cases, the entire body 212 and header 210 was loaded to the Tx processor 216 with the descriptor 208 in step 254, and thus no packet information need be loaded from the main buffer. In some other cases, the body 212 and/or the descriptor 210 are stored in the main buffer. In yet other cases, part of the body 212 is stored with the descriptor 208, and part of the body 212 is stored in the main buffer.

If no packet information need be loaded from the main buffer, then the process continues to step 258, in which the packet information and other information needed to determine the TCP checksum (explained in greater detail with respect to step 270) is provided to the XCS unit 224 from the Tx processor 216. The packet information can be sent via the merge unit 222, without any actual merging occurring, and the other information can be directly provided to the XCS unit, or in other embodiments the other information can be sent via the merge unit 222 with the packet. In next step 260, the XCS unit calculates a TCP checksum from the received information. The checksum is calculated using a pseudo header based on the information in the IP header and from the descriptor, and the checksum calculated based on the TCP segment and pseudo header. An example method for calculating the checksum is described below with reference to FIGS. 5a and 5b. It should be noted that in this case, the checksum is being created rather than adjusted/corrected, since no blind checksum was previously determined. The process then continues to step 272, described below.

If the packet body was not retrieved with descriptor 208 as checked in step 256, then the process continues to step 262, in which the DMA unit 218 is instructed by the Tx processor 216 to load the packet information from the buffer of main storage 22 at an address indicated by address or pointer information in the retrieved descriptor 208, and a blind checksum is calculated. In some cases, the header 210 and the body 212 are retrieved as packet information from main storage 22 in this step, while in other cases, just the body 212 is retrieved.

The blind checksum of step 262 is calculated by an accumulator 219 which can be included in the DMA unit 218. It is a "blind" checksum in the sense that the accumulator does not follow established rules to create a TCP checksum, i.e., with a pseudo header; it instead accumulates a sum simply based on the values of successive normally aligned halfwords (2-byte strings of bits) of packet information retrieved from the buffer of main storage 22 (storage units other than halfwords can be processed in other embodiments). All the halfwords transferred from main storage 22 are included, from the start of the packet up to the end of the IP payload, i.e., including Ethernet header, the IP header, the TCP header, and the body of the packet that are included as the payload of the surrounding IP packet information. Not included are the Ethernet padding bytes (if any) or the Ethernet Cyclical Redundancy Check (CRC), a.k.a. a Frame Check Sequence (FCS) 4-bytes at the end. If the packet information starts or ends on an odd boundary in memory, as indicated by the addresses where it is stored, then the packet information is padded with a zero appropriately to allow the packet to properly align on an even boundary.

In next step 264, the buffer packet information from main storage 22 is stored in the data buffers 220 (this actually can occur as each portion of the packet information is being retrieved by the DMA unit). In addition, once the packet information from main storage 22 is fully retrieved, the accumulated blind checksum value is sent to the Tx processor 216. In step 266, it is checked whether the header 210 was with the body 212 in the packet information retrieved from the buffer of main storage 22 in step 262. In one case, the header 210 was retrieved with the body 212 from the buffer area of main storage 22 and both header and body are stored in data buffers 220; if this is the case, the process continues to step 270, described below, where both header and body are sent via the merge unit 222 to the XCS unit 224.

In the other case, the header 210 is not retrieved with the body 212, since the header 210 was retrieved by the Tx processor 216 in step 254 with the descriptor 208 from the descriptor area of main storage 22. If this is the case, then the process continues to step 268, in which the header from the Tx processor 216 and the body from the data buffers 220 is merged at the merge unit 222. For example, the Tx processor 216 sends the header 210 to the merge unit 222, and then instructs that the body 212 in the data buffers 118 be sent to the merge block 222 to be placed after the header 210 so that the header is merged with the body to create the full packet. The process then continues to step 270.

In step 270, the packet and other information is sent from or via the merge unit 222 to the XCS unit 224. The other information is directly sent from the Tx processor 216 to the XCS unit 224. In other embodiments, the other information can be sent with the packet via the merge unit 222, e.g., prepended to the packet as a "sticker" which is later removed by the XCS unit; such an embodiment requires no direct connections of Tx processor and XCS unit. The other information includes the blind checksum value and an immediate data length (IMMLEN) value that indicates the number of bytes of the packet which has not been included in the blind checksum of step 262 (known from the descriptor 208).

Depending on the parsing abilities of the XCS unit in different embodiments, the other information may also include an IP start offset indicating the offset in halfwords (or other storage unit) at which the IP header begins from the beginning of the packet, a TCP start offset indicating the offset at which the TCP segment begins from the beginning of the packet, and a TCP checksum offset indicating the offset in halfwords at which the TCP checksum field begins. For example, in the described embodiment, the XCS unit 224 does not parse this offset information from the packet, but instead receives it directly from the Tx processor 216, where the Tx processor retrieved it from the descriptor 208. In a different embodiment, the XCS unit 224 can parse the packet to determine these offsets, e.g., start at the beginning of the packet at, e.g., Ethernet packet information, and continue field by field to the IP header start, the TCP header start, the TCP checksum field start, etc.

The XCS unit 224 can include a small buffer (e.g., 256 bytes) allowing random access to access the checksum field (which could end up at virtually any location in the buffer due to various Ethernet, IP, and TCP header lengths and previous packet sizes which may still be in the buffer). The buffer is used to store the packet (or a portion thereof) until the checksum is fully determined.

In next step 272, the XCS unit 224 adjusts the blind checksum value to correct this checksum so that it corresponds to a TCP checksum. The XCS unit determines whether to adjust the blind checksum value based on examined halfwords in the packet. The XCS unit performs this function on the fly, as each halfword is being received; thus, step 272 is preferably integrated with step 274 as the packet information is being received. A method that the XCS unit 224 can use to adjust the blind checksum value, and achieve the TCP checksum, is described in greater detail below with respect to FIGS. 5a and 5b.

In next step 274, the XCS unit 224 places the determined TCP checksum in the TCP header of the packet, using the TCP checksum field offset received as other information in step 270 or 258, and sends the packet out on the line 206 out to the network 14. Once the XCS unit has examined enough halfwords to have fully adjusted the checksum, then the TCP checksum value is placed in the checksum field and the packet is begun to be transmitted, and all remaining halfwords of the packet received at the XCS unit 224 can be output on line 206 on the fly, as they are received; this is a significant advantage of the present invention. The process is then complete at 276. It should be noted that there is no need to discard a created pseudo header, because a pseudo header is never separately created; rather, it is included in the determined checksum as part of the adjustment process. Another significant advantage of the invention is that the random access needed is limited to only the small size of the buffer in the XCS unit (e.g., 256 bytes), instead of for the large size of the data buffers (e.g., 9 kilobytes for a "jumbo" frame buffer). Random access capability is more expensive to set up for larger buffers. In addition, in the present invention, each byte of the packet does not have to be ready from a "distance" and the checksum need not be calculated after the packet is received; rather, the checksum is accumulated as the packet passes, both in the accumulator 219 and in the XCS unit 224, which is much more efficient.

Figure 5A:
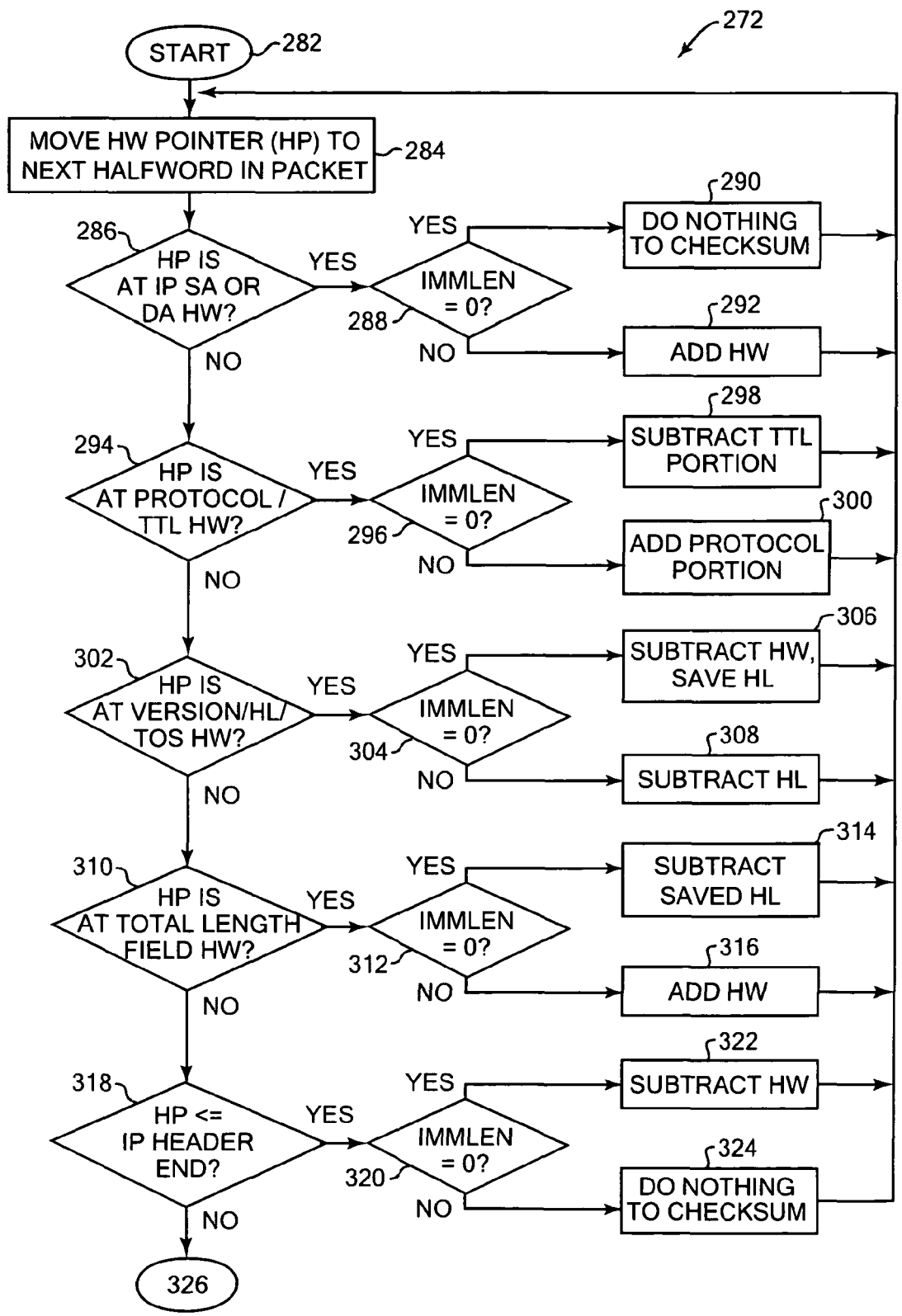
FIGS. 5a and 5b are flow diagrams illustrating a method of the present invention for adjusting and determining a checksum value.
Figure 5B:
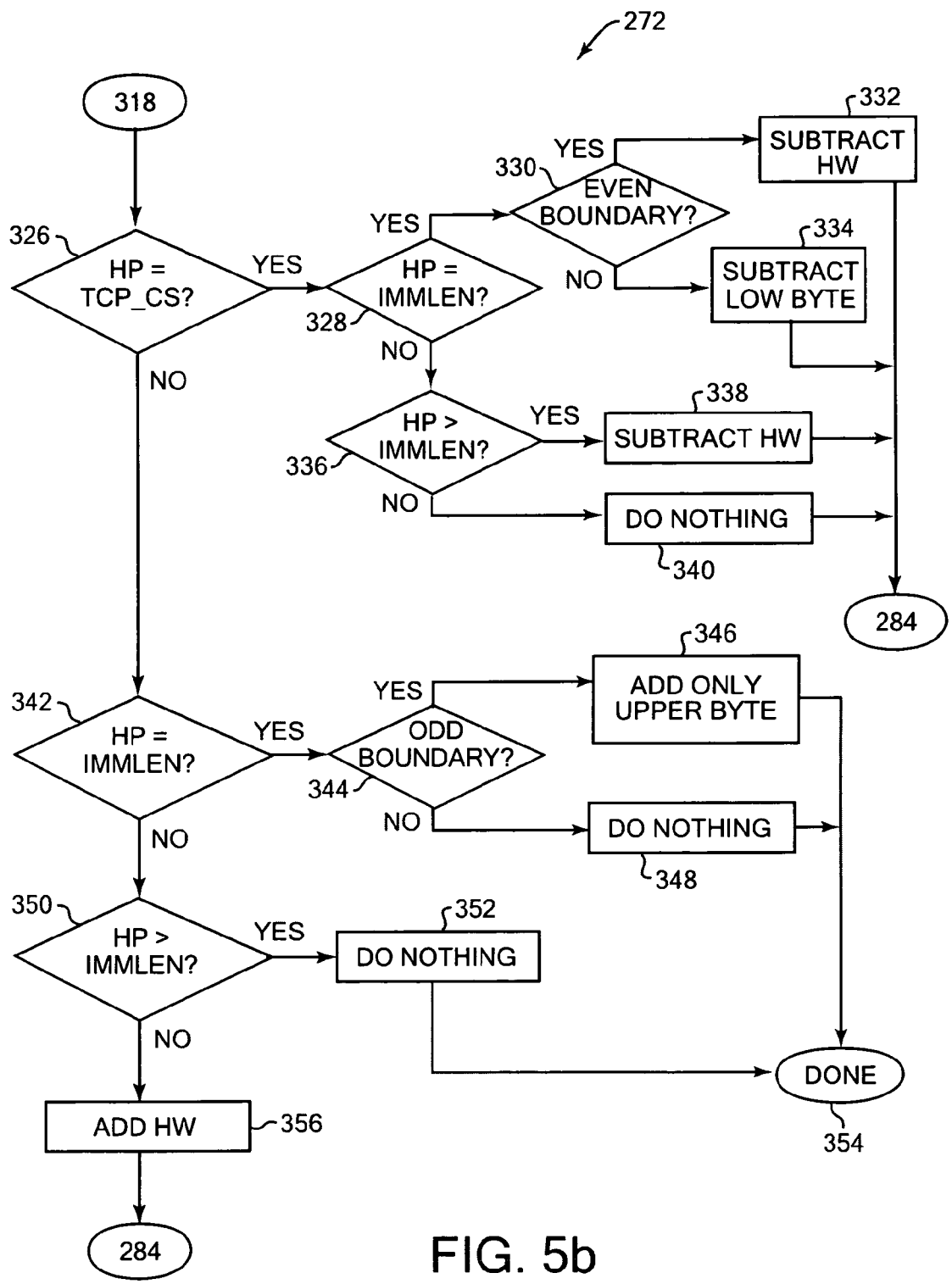

FIGS. 5a and 5b are flow diagrams illustrating a method detailing a particular implementation of step 272 of method 250 of FIG. 4, in which the XCS unit 224 adjusts the blind checksum value to achieve a TCP checksum (or calculates the TCP checksum directly without using a blind checksum, in some cases). The method of FIGS. 5a and 5b is just one example of how the final checksum determination can be implemented.

The process begins at 282 in FIG. 5a, and in step 284, a halfword pointer (HP) is moved to the next halfword (HW) in the received packet information. The first time step 284 is performed, the pointer starts at the first halfword of the packet (offset zero). As detailed above for FIG. 4, the XCS unit 224 receives the blind checksum value from the Tx processor 216, and the packet information that is to be transmitted via the merge unit 222. As each halfword is received by the XCS unit, it moves its halfword pointer to that received halfword, to achieve on-the-fly examination and adjustment of the blind checksum value. As explained above, this method assumes the XCS unit received other information from the Tx processor 216, such as various offsets required in order to know the positions of various fields in the packet and to store it in the TCP header. E.g., the XCS unit knows where the IP header starts due to having received an IP header offset, and knows where the TCP header starts by having received a TCP header offset. Alternatively, the XCS unit can determine or parse these offsets by moving the pointer a known, standard number of bits or bytes through the packet information for each field and offset. Based on these offsets, the XCS can calculate the offsets of other fields such as the IP SA and DA offsets, needed for the checksum determination.

As described above, one of the other values received from the Tx processor 216 is the IMMLEN value, which is the immediate data length for the packet, i.e., the number of bytes in the packet that have not been included in the blind checksum, as known from the descriptor 108. Thus, if IMMLEN equals zero, this indicates that all of the packet halfwords were included in the blind checksum, and that if any adjustment is required for the current halfword, it will be to subtract it from the blind checksum. Likewise, if IMMLEN is not zero (i.e., positive), then some of the packet halfwords were not included in the blind checksum, and subtraction and/or addition of halfwords may be needed for correction. In the described embodiment, it is assumed that IMMLEN is either zero or greater than the IP packet start; this restriction reduces hardware implementation complexity. Other embodiments can used methods to avoid this restriction.

In next step 286, the process checks whether the halfword pointer is at the IP source address (SA) or the IP destination address (DA) stored in the IP header of the packet. This information typically is specified in full words, so there are two halfwords provided for each address. If the pointer is at a halfword for one of these addresses, then the process checks in step 288 whether IMMLEN is equal to zero. If so, then as indicated in step 290 the checksum is not adjusted, and the process returns to step 284 to move to and examine the next halfword. If IMMLEN is not equal to zero, then this IP address information was not included in the blind checksum, and in step 292 the current halfword is added to the blind checksum. This is because the IP source and destination addresses are required for TCP checksum determination, i.e., these addresses are included in the pseudo header used in TCP checksum determination. The process then returns to step 284.

If the check of step 286 is negative, then in step 294 the process checks whether the halfword pointer is at a halfword describing the protocol field and time-to-live (TTL) field of the IP header of the packet. Each of these fields is a byte, and thus the halfword would include both fields. If the pointer is at this halfword, then in step 296 the process checks whether IMMLEN is equal to zero (i.e., whether this halfword is already included in the blind checksum). If so, in step 298 the TTL portion (byte) of the halfword is subtracted out, since the TTL field is not needed in the pseudo header to determine the TCP checksum; this leaves the protocol field, which is needed in the pseudo header. The process then returns to step 284 to move to and examine the next halfword. If IMMLEN is not equal to zero, then this IP address information was not included in the blind checksum, and in step 300 the protocol portion of the halfword (byte) is added to the blind checksum, since the protocol field is needed in the pseudo header. The process then returns to step 284.

If the check of step 294 is negative, then in step 302 the process checks whether the halfword pointer is at a halfword describing the Version field (half byte), IP Header Length (HL) field (half byte), and Type of Service (TOS) field (1 byte) of the IP header of the packet. If the pointer is at this halfword, then in step 304 the process checks whether IMMLEN is equal to zero. If so, in step 306 this halfword is subtracted from the blind checksum, since these fields are not needed in the TCP pseudo header. In addition, the IP Header Length field is saved in a hardware latch (or other convenient storage), since this field is needed for step 314 (described below). The process then returns to step 284. If IMMLEN is not equal to zero, then the current halfword was not included in the blind checksum, and in step 308 the IP Header Length field is subtracted from the blind checksum. This is in anticipation of step 316 (described below), in which the total length is added; since the required pseudo header length field is the TCP segment length (IP total length minus IP header length), the IP Header Length can be subtracted out now. The process then returns to step 284. Note that this is an advantage of the present invention: a normally unused adder cycle in which the XCS unit would do nothing, is instead efficiently utilized to make an adjustment to the blind checksum in anticipation of other adjustments, thus saving additional operations at the time of those later adjustments and avoiding the use of additional halfword adders.

If the check of step 302 is negative, then in step 310 the process checks whether the halfword pointer is at a halfword describing the IP Total Length field of the packet in the IP header of the packet. If the pointer is at this halfword, then in step 312 the process checks whether IMMLEN is equal to zero and this halfword is included in the blind checksum. If so, in step 314 the IP Header Length field saved in a latch in step 306 is subtracted from the blind checksum, since the pseudo header needs the TCP segment length (i.e., IP total length minus IP header length) to determine the TCP checksum. The process then returns to step 284. If IMMLEN is not equal to zero, then the current halfword was not included in the blind checksum, and in step 316 the current halfword is added to the blind checksum. This creates the desired TCP segment length in the pseudo header since the IP Header Length is subtracted in step 308. The process then returns to step 284.

If the check of step 310 is negative, then in step 318 the process checks whether the halfword pointer is less than or equal to the IP header end, i.e. whether the pointer is at a halfword in the IP header that is not covered by the steps described above. If the pointer is at such a halfword location in the packet, then in step 320 the process checks whether IMMLEN is equal to zero and this halfword is included in the blind checksum. If so, in step 322 the current halfword is subtracted from the blind checksum value, since the pseudo header or TCP checksum does not need any other IP header halfwords or fields except those described in the steps above. The process then returns to step 284. If IMMLEN is not equal to zero, then the current halfword was not included in the blind checksum, and as indicated in step 324, the checksum is not adjusted. The process then returns to step 284.

If the check of step 318 is negative, then the process continues to step 326, as detailed in FIG. 5b. The remaining steps include situations where the halfword pointer is pointed to halfwords in the TCP header, the TCP payload, and after the TCP payload.

In step 326, the process checks whether the halfword pointer is equal to the TCP checksum field. If so, in step 328, the process checks whether the halfword pointer is equal to IMMLEN, i.e., whether the current halfword has an offset equal to the number of bytes not included in the blind checksum. If so, then it indicates that the halfword pointer is at the halfword at a boundary, and that the checksum field is at that boundary. In step 330 the process checks whether IMMLEM is on an even-numbered address boundary. If so, a halfword is subtracted out in step 332, and the process returns to step 284. If on an odd boundary, then only the lower byte of the halfword is subtracted out in step 334, since the upper byte is already included in the blind checksum. The process then returns to step 284. If the pointer is not equal to IMMLEN at step 328, then in step 336 the process checks whether the pointer is greater than IMMLEN. If so, a halfword is subtracted out in step 338, and the process returns to step 284. If not, the checksum is not adjusted as indicated in step 340, and the process returns to step 284.

In step 326, the process checks whether the halfword pointer is equal to IMMLEN, i.e., whether the current halfword has an offset equal to the number of bytes not included in the blind checksum. If so, then it indicates that the halfword pointer is at the halfword at a boundary, such as the boundary between the IP header and the TCP header, or the boundary at the end of the packet; the location of the boundary depends on how much of the packet was included in the blind checksum. In step 328 the process checks whether IMMLEM is on an odd-numbered address boundary. If so, then in step 330 only the upper byte of the current halfword is added to the blind checksum value, since the lower byte belongs to the TCP header, for example, and was already included in the blind checksum value. The blind checksum value has thus been fully adjusted to conform to a TCP checksum, and the process is then complete at 338. If the pointer is at an even numbered boundary, then no additional bytes need be added, and the blind checksum value is not corrected as indicated in step 332 (e.g., a zero can be added). The adjustment/correction process of the blind checksum is then over as indicated at 338, resulting in a TCP checksum value.

If the check of step 326 is negative, then the process continues to step 334, in which the process checks whether the halfword pointer is greater than IMMLEN, i.e., whether the current halfword is at a halfword already included in the blind checksum or is after the end of the TCP payload. If so, then remaining halfwords are already included in the blind checksum value, and the checksum is not adjusted as indicated in step 336. The adjustment process of the blind checksum to a TCP checksum value is then over as indicated at 338. If the halfword pointer is not greater than IMMLEN at step 334, then it is less than IMMLEN and pointing to a halfword that was not included in the blind checksum. Thus, in step 340, the current halfword is added to the blind checksum, and the process then returns to step 284 for the next halfword. For example, step 340 can add halfwords to the checksum from the TCP header or body which were not included in the blind checksum (or if a blind checksum was never created, e.g., the body 212 was provided directly to Tx processor 216).

It should be noted that the process of FIGS. 5a and 5b assumes that the header 210 is not stored so that it is split between the descriptor area of main storage 22 and the buffer area of main storage, i.e., that the header data remains contiguous. This is because this process assumes that the IMMLEN value, retrieved from the descriptor 108, does not fall within the Ethernet or IP header, i.e., it is either zero or greater than the start offset of the IP header.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus for transmitting packets on a network, the apparatus comprising:
a memory access unit configured for successively retrieving portions of a packet from a storage device prior to the packet being transmitted on a network;
an accumulator in communication with the memory access unit, the accumulator configured for accumulating a blind checksum value based on the retrieved portions of the packet as the portions of the packet are retrieved, from a start of the packet to an end of a body of the packet;
a transmission processor in communication with the accumulator configured to receives descriptor information and the accumulated blind checksum value; and
a transmission checksum unit in communication with the transmission processor, and configured to adjust the blind checksum value to a protocol checksum based on the descriptor information describing the structure of the packet, to insert the protocol checksum in the packet, and to output the packet for transmission on the network.

2. The apparatus of claim 1 wherein the accumulator is configured to accumulate the blind checksum value by summing the successively retrieved portions of the packet.

3. The apparatus of claim 1, wherein the transmission processor is further configured to retrieve the descriptor information directly from the storage device and provides the descriptor information to the transmission checksum unit for adjusting the blind checksum value to the protocol checksum.

4. The apparatus of claim 3 wherein the transmission processor is configured to selectively receive the bodies of packets directly from the storage device without the bodies of the packets passing through a buffer.

5. The apparatus of claim 4, further comprising:
a data buffer coupled to the memory access unit, wherein the data buffer selectively receives the bodies of some packets from the memory access unit, and wherein the retrieved portions of the packets are sent from the data buffer to the transmission unit.

6. The apparatus of claim 1 wherein the packets to be transmitted on the network each include a header and a body, wherein the headers and bodies of some packets are stored contiguously in the memory device and the headers and bodies of other packets are stored in separate areas of the memory device depending on the sizes of the bodies.

7. The apparatus of claim 1, wherein the memory access unit is configured to retrieve the header of the packet together with the descriptor information from the memory device, and wherein the body of the packet is retrieved separately from the header and descriptor information and stored in a buffer while the portions of the packet are retrieved.

8. The apparatus of claim 7 further comprising:
a merge unit in communication with the buffer for receiving the body of the packet and in communication with the transmission processor for receiving the header and descriptor information, wherein the merge unit is configured to merge the header with the body of the packet in response to the accumulator having determined the blind checksum, and wherein the transmission checksum unit receives the merged header and body from the merge unit and inserts the protocol checksum in the packet.

9. The apparatus of claim 1 wherein the transmission checksum unit is configured to adjust the blind checksum value, at least in part, by adding or subtracting at least one halfword value of the packet information to or from the blind checksum value.

10. The apparatus of claim 9 wherein the packet to be transmitted is a TCP/IP packet, and wherein the transmission checksum unit adjusts the blind checksum value by adding a halfword value to the blind checksum value if the halfword value is an IP header field required to determine a TCP checksum value and the halfword value was not included in the blind checksum.

11. The apparatus of claim 9 wherein the packet to be transmitted is a TCP/IP packet, and wherein the transmission checksum unit adjusts the blind checksum value by subtracting a halfword value from the blind checksum value if the halfword value is an IP header field not required to determine a TCP checksum value and the halfword value was included in the blind checksum.

12. The apparatus of claim 3, wherein the transmission processor is configured to also retrieve the packet along with the descriptor information from the storage device and provide the packet to the transmission checksum unit.

13. The apparatus of claim 6, wherein the blind checksum value is determined only when the header is stored separately from the descriptor in the memory device.

14. The apparatus of claim 1, wherein the transmission checksum unit is configured to determine the descriptor information, at least in part, by parsing the packet information.

15. The apparatus of claim 1 wherein the packet is provided according to the TCP/IP protocol.

16. The apparatus of claim 9 wherein the transmission checksum unit is configured to adjust the blind checksum value, at least in part, by subtracting out bytes of an IP header portion of the packet and leaving in bytes of the IP header portion that are needed for a pseudo header to create a TCP checksum.

17. The apparatus of claim 16 wherein the transmission checksum unit is further configured to adjust the blind checksum value by subtracting out one byte of a halfword and keeping the other byte of the halfword for fields in the IP header portion in which only one byte of the field is needed in the pseudo header.

18. The apparatus of claim 9 wherein the transmission checksum unit is further configured to adjust the blind checksum value by subtracting out one byte of a halfword and keeping the other byte of the halfword if the halfword is positioned on a boundary between a portion of the packet already included in the blind checksum value and a portion not included in the blind checksum value.

19. The apparatus of claim 1 wherein the transmission checksum unit determines and places the protocol checksum in a protocol checksum field of the packet without creating a pseudo header having specified fields from the packet.

* * * * *